United States Patent
Suo et al.

(10) Patent No.: US 11,314,529 B2
(45) Date of Patent: Apr. 26, 2022

(54) DYNAMICAL SWITCHING BETWEEN LONG-TERM AND SHORT-TERM REWARDS

(71) Applicant: Walmart Apollo, LLC, Bentonville, AR (US)

(72) Inventors: Xiaotong Suo, Menlo Park, CA (US); Abhimanyu Mitra, San Jose, CA (US); Kannan Achan, Saratoga, CA (US); Afroza Ali, Los Altos, CA (US); Kailing Wang, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/748,452

(22) Filed: Jan. 21, 2020

(65) Prior Publication Data

US 2021/0224082 A1    Jul. 22, 2021

(51) Int. Cl.
*G06F 9/451*   (2018.01)
*G06N 20/00*   (2019.01)

(52) U.S. Cl.
CPC ............ *G06F 9/451* (2018.02); *G06N 20/00* (2019.01)

(58) Field of Classification Search
CPC ................................ G06F 9/451; G06N 20/00
See application file for complete search history.

(56) References Cited

U.S. PATENT DOCUMENTS

| | | | |
|---|---|---|---|
| 8,458,103 B2 | 6/2013 | Brooks et al. | |
| 9,361,322 B1* | 6/2016 | Dutta | G06Q 30/00 |
| 9,519,916 B2 | 12/2016 | Brooks et al. | |
| 10,242,381 B1 | 3/2019 | Zappella et al. | |
| 10,404,566 B2 | 9/2019 | Gomez-Uribe | |
| 10,467,313 B2 | 11/2019 | Wang et al. | |
| 10,521,824 B1* | 12/2019 | Boshy | G06Q 30/0269 |
| 10,545,624 B2 | 1/2020 | Meyerzon et al. | |
| 10,600,004 B1 | 3/2020 | Misko et al. | |
| 10,747,805 B1* | 8/2020 | Bragdon | G06F 16/447 |
| 2012/0023043 A1 | 1/2012 | Cetin et al. | |
| 2014/0108640 A1* | 4/2014 | Mathis | H04L 63/1425 709/224 |
| 2016/0191450 A1 | 6/2016 | Lineberger et al. | |
| 2016/0191650 A1 | 6/2016 | Rong et al. | |
| 2017/0300939 A1* | 10/2017 | Chittilappilly | G06N 20/00 |
| 2018/0121964 A1 | 5/2018 | Zhang et al. | |
| 2018/0174038 A1 | 6/2018 | Jiang et al. | |
| 2018/0189826 A1* | 7/2018 | Xu | G06Q 30/0247 |

(Continued)

OTHER PUBLICATIONS

Yan et al., "Cohort Modeling for Enhanced Personalized Search", 2014, p. 1-10.

(Continued)

*Primary Examiner* — Beau D Spratt
(74) *Attorney, Agent, or Firm* — Duane Morris LLP; Manita Rawat (57) ABSTRACT

A system and method for content selection and presentation is disclosed. A plurality of content elements configured for presentation in at least one content container is received and one of the plurality of content elements is selected for presentation in the at least one content container. The one of the plurality of content elements is selected by a trained selection model based on an optimal impression allocation. An interface is generated that includes the selected one of the plurality of content elements.

19 Claims, 5 Drawing Sheets

(56) References Cited

U.S. PATENT DOCUMENTS

| | | |
|---|---|---|
| 2019/0220460 A1* | 7/2019 | Harmsen .............. G06F 16/245 |
| 2019/0311287 A1 | 10/2019 | Chew et al. |
| 2019/0363966 A1 | 11/2019 | Gomez-Uribe |
| 2020/0019636 A1 | 1/2020 | Srinivasaraghavan |
| 2020/0033144 A1* | 1/2020 | Du .................... G01C 21/3476 |
| 2020/0042920 A1 | 2/2020 | Moorthy et al. |
| 2020/0327577 A1 | 10/2020 | Truong et al. |
| 2020/0342500 A1 | 10/2020 | Kulkarni et al. |
| 2021/0142118 A1 | 5/2021 | Lugt et al. |
| 2021/0224082 A1 | 7/2021 | Suo et al. |

OTHER PUBLICATIONS

Broden et al. "Ensemble Recommendations via Thompson Sampling: an Experimental Study within e-commerce", Mar. 2018 https://dl.acm.org/doi/pdf/10.1145/3172944.3172967 (Year: 2018).

* cited by examiner

DYNAMICAL SWITCHING BETWEEN LONG-TERM AND SHORT-TERM REWARDS

TECHNICAL FIELD

This application relates generally to personalized content prediction and, more particularly, to selection of content elements using trained selection models.

BACKGROUND

Various network interfaces, such as e-commerce interfaces, are configured to present one or more interface pages including a plurality of containers (or slots). A plurality of content elements may be available for each container. For example, in e-commerce environments, a carousel module may have multiple options for filling the open spots on the carousel.

Current interface systems are configured to select elements for filling open containers or slots in an interface based on short-term reward mechanisms. For example, in some embodiments, an element having the highest click-through rate (CTR) may be selected for presentation to a user. Short-term reward mechanisms and systems are prone to randomness and noise, and fail to take into account long-term or changing user preferences. In addition, customer personas may change, due to time or circumstances.

SUMMARY

In various embodiments, a system for content selection and presentation is disclosed. The system includes a memory having instructions stored thereon, and a processor configured to read the instructions to receive a plurality of content elements configured for presentation in at least one content container, select one of the plurality of content elements for presentation in the at least one content creator, and generate an interface including the selected one of the plurality of content elements. The one of the plurality of content elements is selected by a trained selection model based on an optimal impression allocation.

In various embodiments, a non-transitory computer readable medium having instructions stored thereon is disclosed. The instructions, when executed by a processor cause a device to perform operations including receiving a plurality of content elements configured for presentation in at least one content container, selecting one of the plurality of content elements for presentation in the at least one content container, and generating an interface including the selected one of the plurality of content elements. The one of the plurality of content elements is selected by a trained selection model based on an optimal impression allocation.

In various embodiments, a computer-implemented method is disclosed. The method includes steps of receiving a plurality of content elements configured for presentation in at least one content container, selecting one of the plurality of content elements for presentation in the at least one content container, and generating an interface including the selected one of the plurality of content elements. The one of the plurality of content elements is selected by a trained selection model based on an optimal impression allocation.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

Figure 1:
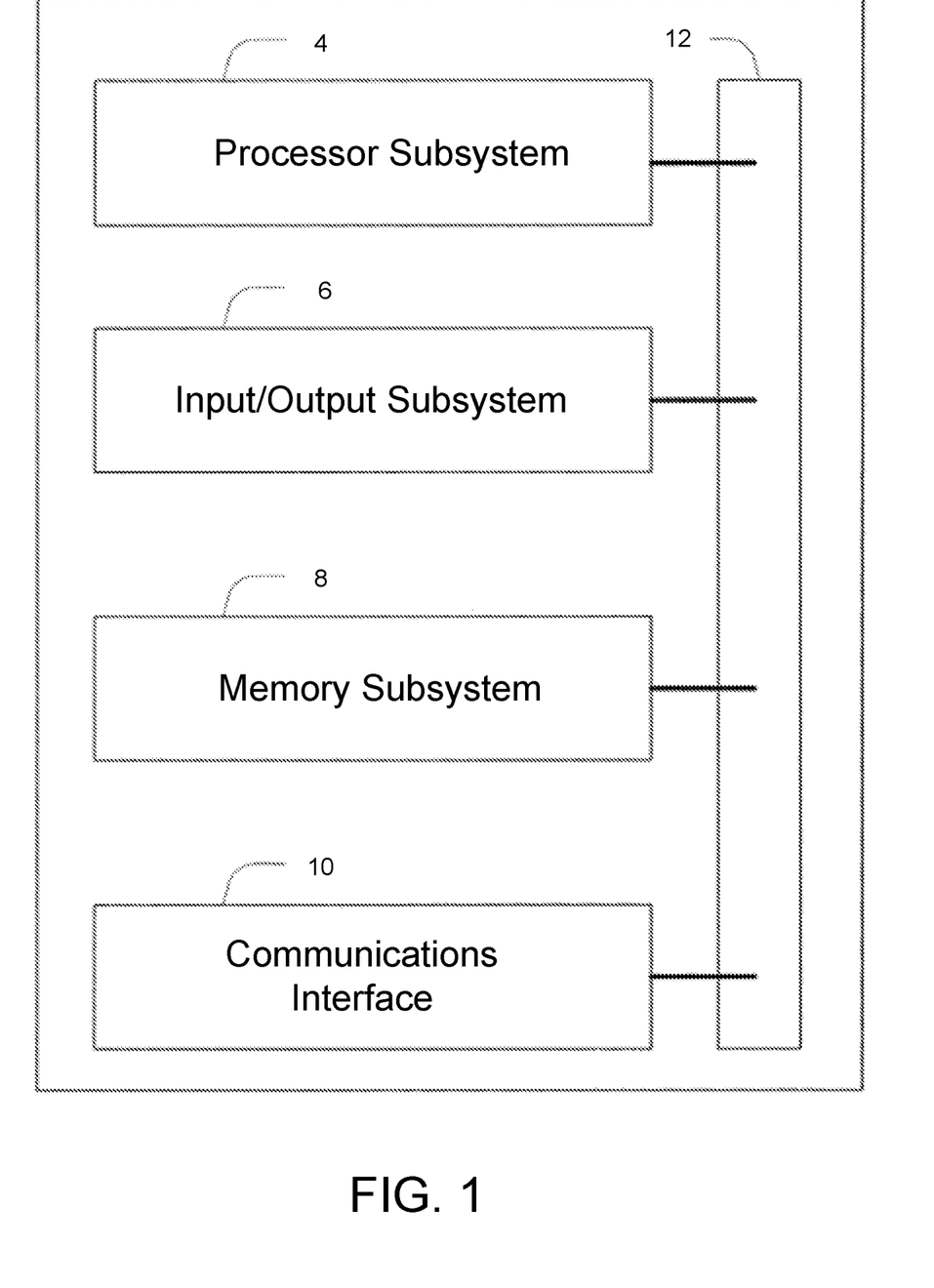
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
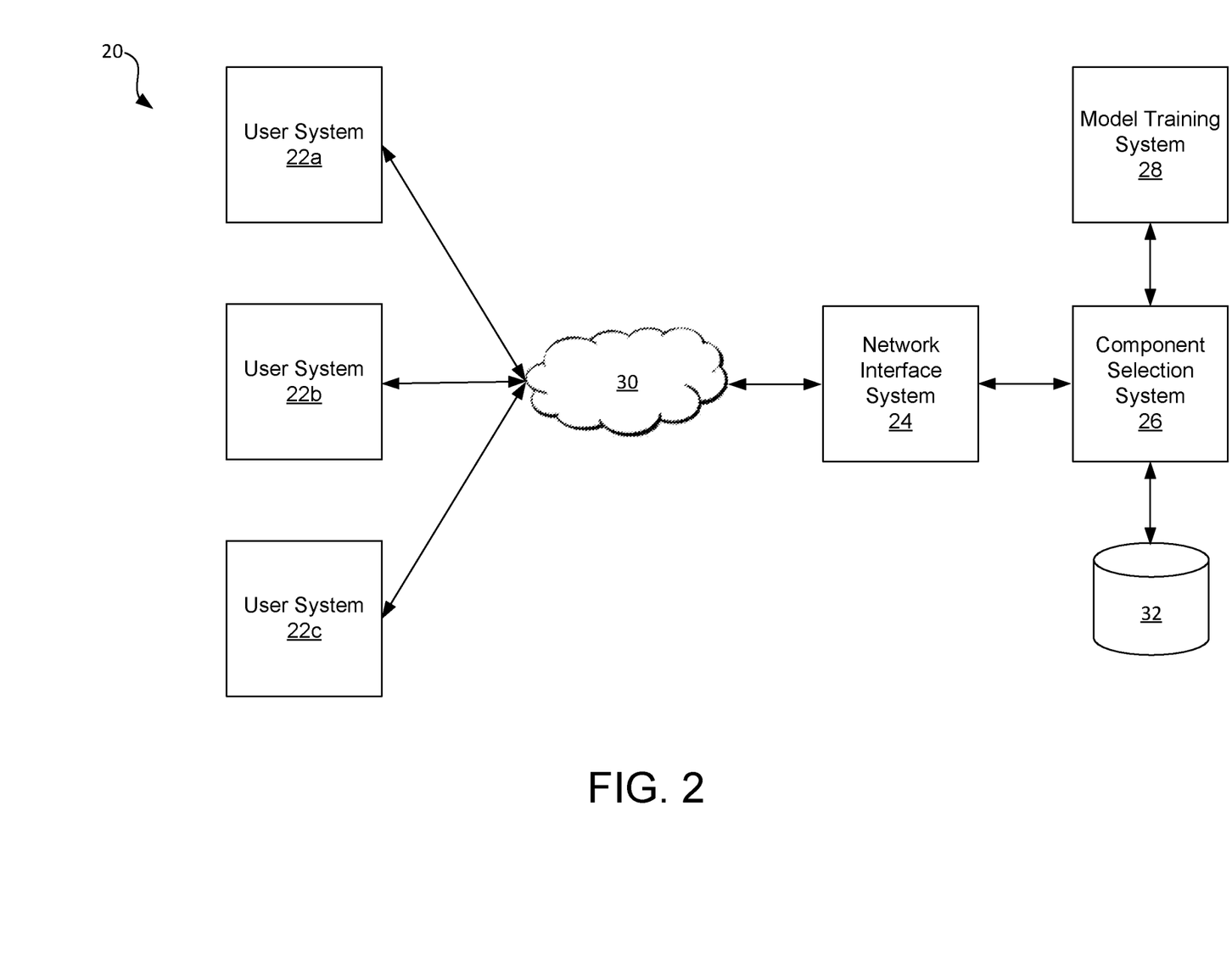
FIG. 2 illustrates a network configured to provide an interface including one or more components selected using a trained content selection model configured to implement an optimal impression allocation, in accordance with some embodiments.

FIG. 2 illustrates a network environment 20 configured to provide one or more components having content selected using a trained content selection network, in accordance with some embodiments. The network 20 includes one or more user systems 22a-22c, a network interface system 24, a content selection system 26, a model training system 28, and/or any other suitable system. Each of the systems 22a-28 can include a computer system, such as the computer system 2 described above in conjunction with FIG. 1. It will be appreciated that each of the systems 22a-28 can include generic systems and/or special purpose systems, and are within the scope of this disclosure.

Each of the systems 22a-28 are configured to exchange data over one or more networks, such as, for example, network 30. In some embodiments, the one or more user devices 22a-22c are configured to communicate with the network interface system 24, which is configured to present one or more interfaces, such as an e-commerce interface. The presented interface includes one or more components, such as, for example, one or more carousels, one or more dynamic components, one or more web components, etc. At least one of the components may be filled by a plurality of content elements. In some embodiments, content elements for at least one of the interface components is selected by the content selection system 26.

In some embodiments, the content selection system 26 is configured to select a content element for filling an open slot using a trained content selection network. As discussed in greater detail below, the trained neural network may be configured to balance short-term rewards and long-term rewards for potential content elements. For example, in some embodiments, a predetermined number of potential content elements may be stored in a database, such as database 32. The set of potential content elements may have a short-term reward value given a user persona based on immediate rewards (e.g., click-through-rate) of the content element and a long-term reward value based on user return rate for one or more personas. The short-term reward and long-term reward values may be actual reward values and/or estimated reward values. In some embodiments, content elements may be stored in a database 32 and retrieved by the content selection system 26. For example, in some embodiments, a set of potential content elements may be retrieved from the database 32. The trained content selection model selects presentation content elements from the set of one or more potential content elements.

As discussed in greater detail below, the trained neural network includes a "contextual" element configured to consider the context of a user interacting with the presented interface. For example, in some embodiments, a user may be sorted into one or more predetermined "personas" corresponding to a group of customers having common characteristics. In some embodiments, the "personas" may include, but are not limited to, life-stage personas (e.g., single, married, family with a baby, etc.), department personas (e.g., technology, fashion, sports, etc.), and/or any other suitable personas. In some embodiments, the trained content selection model is configured to achieve optimal impression allocations using short-term and long-term reward values.

In some embodiments, the content selection system 26 receives a trained content selection model from a model training system 28. As discussed below, the model training system 28 is configured to implement a machine learning process using a reinforcement learning mechanism, such as, for example, a contextual bandit approach, a state-action-reward-state-action (SARSA) process, Thompson sampling, and/or any other suitable reinforcement learning mechanism. In some embodiments, the model training system 28 is configured to iteratively modify one or more machine learning (e.g., artificial intelligence, neural network, etc.) models based on additional training data, modified rewards values, and/or other data received from additional systems, such as the network interface system 24 and/or the content selection system 26.

Figure 3:
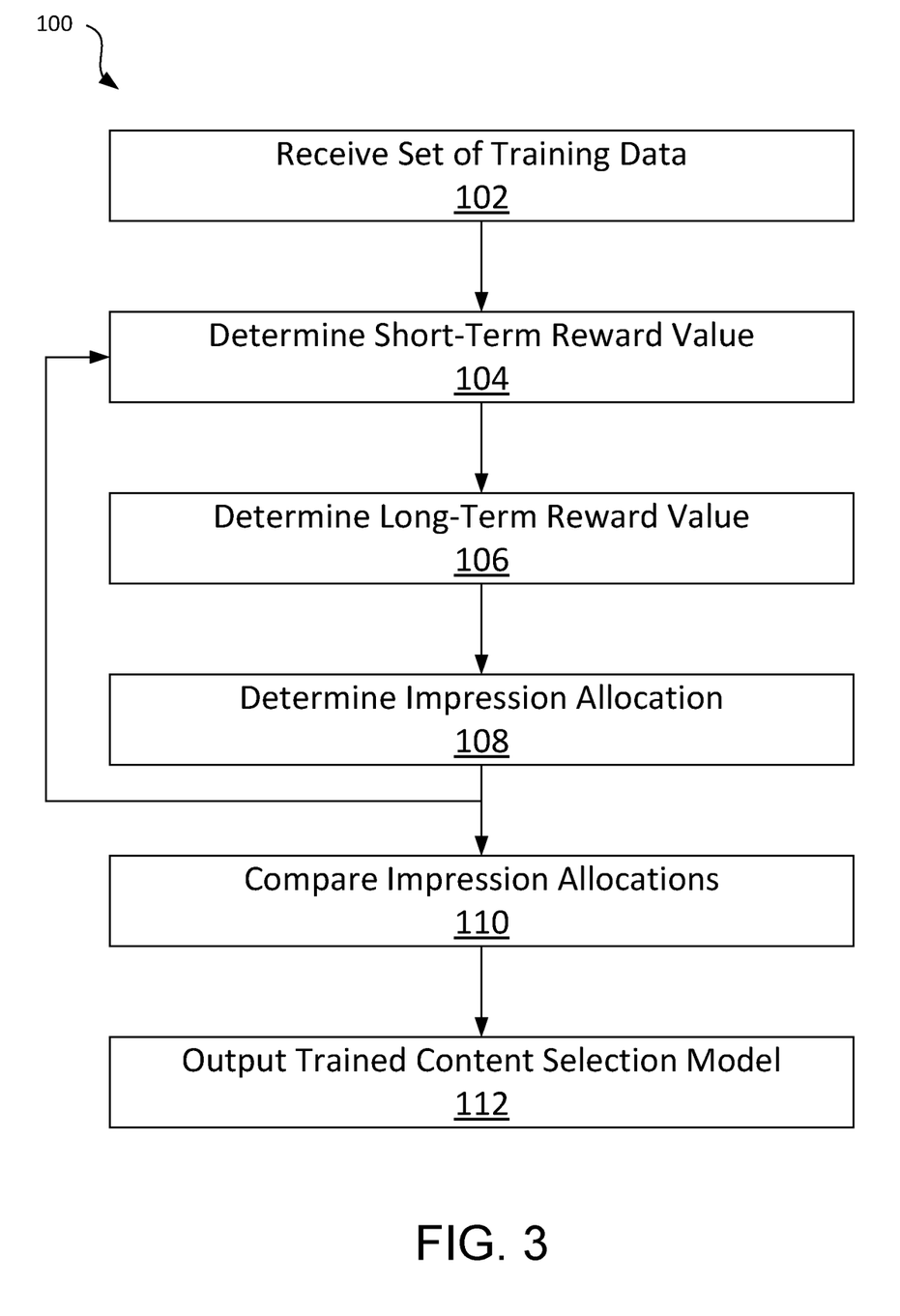
FIG. 3 illustrates a method of generating a trained content selection model, in accordance with some embodiments.
Figure 4:
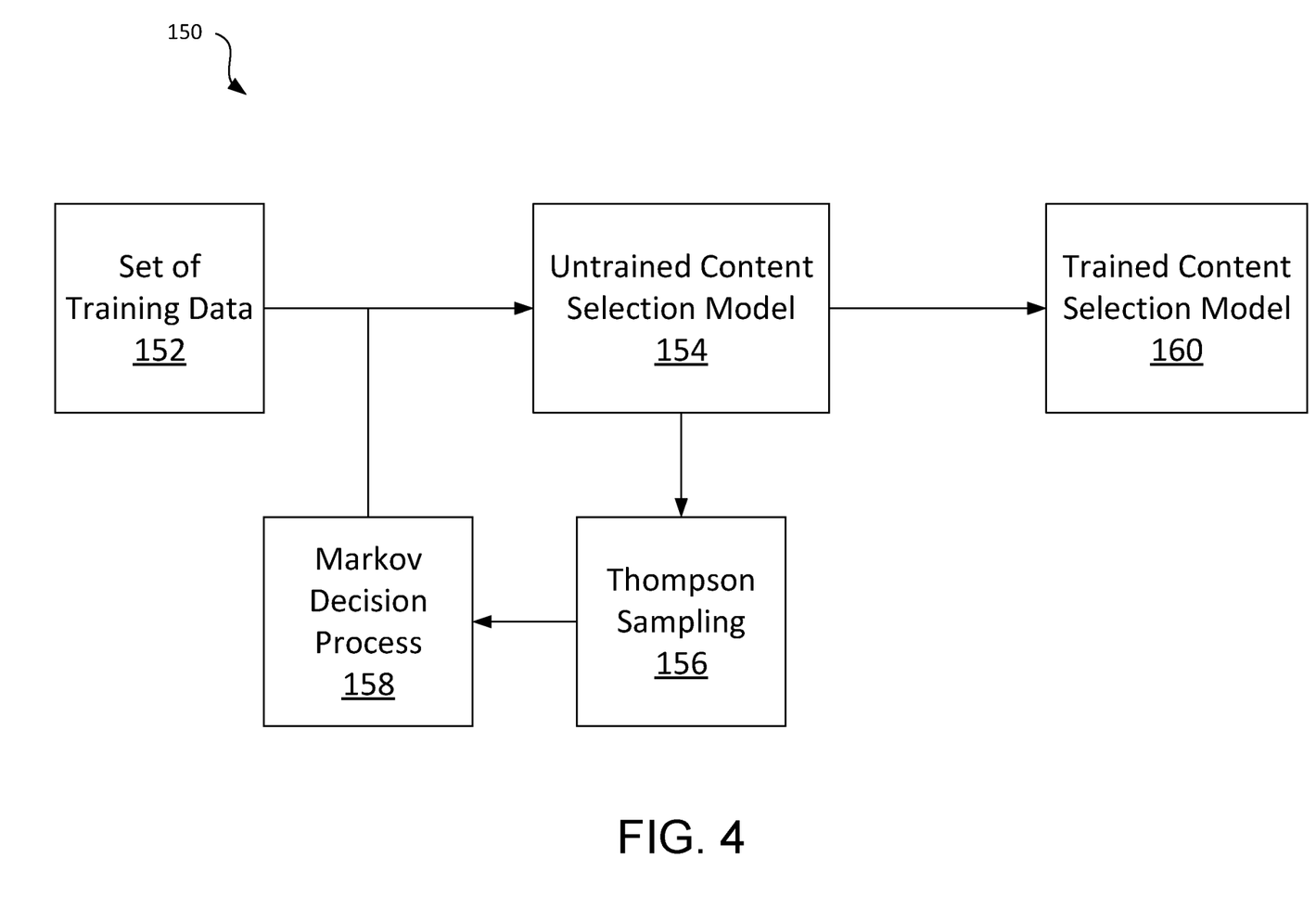
FIG. 4 illustrates a process of training a content selection model according to the method of FIG. 3, in accordance with some embodiments.

FIG. 3 is a flowchart illustrating a method 100 of generating a trained content selection model, in accordance with some embodiments. FIG. 4 is a process flow 150 illustrating various steps of the method 100 illustrated in FIG. 3, in accordance with some embodiments. At step 102, a set of training data 152 is received. The set of training data 152 includes a plurality of user impressions for at least one component in an interface (e.g., a plurality of user interactions with a component and one or more potential content elements for the component). The impression data may include a success or reward indication, such as, for example, a click-through rate, user return rate, historic purchase data, and/or any other suitable reward data. In some embodiments, the set of training data 152 is limited to data obtained from users having a predetermined persona.

In some embodiments, the set of training data 152 is used to train a content selection model 154 to select an action a based on an impression allocation configured to allocate impressions between an immediate reward value and a long-term reward value, Q. For example, in some embodiments, at least a portion of the set of training data 152 is provided to an untrained content selection model 154 (e.g., neural network configured to implement a reinforcement learning framework. At step 104, a short term reward value R is determined. In some embodiments, the set of training data 152 includes a set of short term reward values $R_i$:

$$S_i, C_1, R(S_i, C_1)$$
$$S_i, C_2, R(S_i, C_2)$$
$$\vdots$$
$$S_i, C_{K_{S_i}}, R(S_i, C_{K_{S_i}})$$

where $i \in 1, 2, \ldots K_s$, $K_s$ is a fixed positive integer for each context (e.g., persona) $S_i$, $C_j$ represents a content element (or action) where $j \in 1, 2, \ldots K_s$, and R represents a short term/immediate reward function. In some embodiments, the set of training data 152 includes a set of triples $(S_i, C_k, R_k)$ indexed by $k=1, 2, \ldots, S_j$. In some embodiments, when the reward distribution is fixed and the reward function is $R \in \{0,1\}$, a beta-Bernoulli distribution is applied.

In some embodiments, Thompson sampling 156 is applied to the reward function to provide a set of representative reward samples. For example, in some embodiments, a plurality of samples are obtained from the set of training data 152. A set of content elements are selected and the reward function of each selected content element is observed. The posterior distribution of the reward function R is updated based on the observed reward values. U.S. patent application Ser. No. 16/748,313, filed concurrently with the present application, which is incorporated by reference herein in its entirety, discloses a content selection model configured to implement Thompson sampling with a long-term reward function Q.

At step 106, an evaluation framework using reinforcement learning is applied to determine long-term reward values. In some embodiments, a Markov Decision Process 158 is specified as $(S,C,P,R,\gamma)$, where S represents a state space, C represents a content space, P represents a transition function where $P(S'|S,C)$ is a probability of transition into $S'$ by taking action C in state S, and R represents the immediate reward function. In some embodiments, R is defined as:

$$R(S,C) = \mathbb{E}[r_t | S_t = S, C_t = C]$$

In some embodiments, the state space S includes personas for each user, the content space C corresponds to the selected, personalized content elements shown to a user after observing the user's persona, and/or the short-term reward function R is a conversion rate, click-through rate, and/or any other suitable metric.

In some embodiments, the state space S and the content space C are finite and sufficiently small such that estimation of Q in the set of training data 152 can be achieved by a modified state-action-reward-state-action (SARSA) process. In some embodiments, the SARSA process is configured to initialize the value of Q, initialize a Q for all states S (e.g., personas) and all actions C (e.g., content elements). The value of Q may be initialized to an arbitrary value. A state S is selected and a content element C is selected using an explore-exploit solution, such as, for example, an $\epsilon$-greedy solution. The immediate reward R for one or more next states $S'$ is observed and a next content element, $C'$ is selected for $S'$ using an explore-exploit solution, such as, for example, an $\epsilon$-greedy solution. A posterior distribution of $Q(S,C)$ may be updated. A terminal state S may be added to indicate the state in which a user does not return to a website within time period T.

At step 108, the content selection model is configured to determine an optimal impression allocation for at least one interface. In some embodiments, an impression allocation is determined based on the estimated $\hat{Q}$ of the set of training data 152 is calculated as:

$$\hat{I}_{S_i, C_i} = \frac{w(\hat{Q}_{i,Train)}(S_i, C_i))}{\sum_{C_j} w(\hat{Q}_{i,Train)}(S_i, C_j))}$$

The long-term reward Q is calculated by extending a set of training data 152 to a longer period and calculating a sum of discounted short term rewards. In some embodiments, the long-term reward Q calculation may be simplified by using a recursion structure (as discussed below):

$$Q(S,C) = R(S,C) + \Sigma P(S'|S,C) * \max C' \gamma t Q(S',C')$$

where a customer returns to the interface after t days and returns in state S'. In other embodiments, an estimated impression allocation is generated from a reward function multiplied by a reward generated from the test data to choose an optimal impression allocation:

$$\sum_{C_i} \hat{I}_{S_i,C_i} \times \hat{R}_{(i,Test)}(S_i, C_i)$$

where:

$$\hat{I}_{S_i,C_i} = \frac{w(\hat{R}_{i,Train})(S_i, C_i)}{\sum_{C_j} w(\hat{R}_{i,Train})(S_i, C_j)}$$

and w $(\hat{R}_{i,Train})(S_i, C_i))$ can be estimated from Thompson sampling, obtained by bootstrapping from the posterior distribution of the reward function, and/or obtained from a posterior mean of the reward function. The optimal impression allocation provides the optimal rate of presentation for different content elements to a user having a persona $(S_i)$. As discussed in greater detail below, the optimal impression allocation is used by a content selection system 26 to select content elements for presentation to a user.

In some embodiments, at step 110, reward functions for different potential rewards are calculated and compared to select an optimal impression allocation based on one or more predetermined criteria. For example, in some embodiments, a first impression allocation and a second impression allocation are calculated and compared, such as, for example:

$$\sum_{C_i} \frac{w(\hat{R}_{i,Train})(S_i, C_i)}{\sum_{C_j} w(\hat{R}_{i,Train})(S_i, C_j)} \times \hat{R}_{(i,Test)}(S_i, C_i) = m1$$

$$\sum_{C_i} \frac{w(\hat{R}'_{i,Train})(S_i, C_i)}{\sum_{C_j} w(\hat{R}'_{i,Train})(S_i, C_i)} \times \hat{R}_{(i,Test)}(S_i, C_i) = m2$$

In some embodiments, R is a first reward function based on a first reward type and R' is a second reward function based on a second reward type. In one non-limiting example, R may be a reward function based on one of conversion rate, click-through-rate, revenue generation, etc. and the R' may be a reward function based on a second of conversion rate, click-through-rate, revenue generation, etc.

In some embodiments, a predetermined selection criteria may include a preference for one type of reward as compared to a second type of reward. For example, if a first reward type is preferred (e.g., conversion rate, click-through rate, etc.) over a second reward (e.g., revenue generation), the estimated impression allocation derived from a reward function R of the first reward type is optimal when $m_1 \geq m_2$ and the estimated impression allocation derived from a reward function R' of the second reward type is optimal when $m_1 \leq m_2$. Although specific embodiments are discussed herein, it will be appreciated that the predetermined selection criteria can include any suitable criteria, such as, for example, any suitable business focus, preference, and/or other criteria.

In some embodiments, a reward function, such as the reward function used to determine impression allocation (e.g., w(.) function discussed above) may be selected based on a hypothesis testing process. A set of samples, N, may be generated for each reward function. An average of the estimated impression allocation for each reward function is calculated and compared. In some embodiments, a subset of the set of testing data 152 is used to compare the resulting reward value (based on each impression allocation) to select an optimal impression allocation. For example, when applied to first reward type R=Q (long-term reward) and R'=R (short-term reward), step 110 may perform impression allocation based on short-term rewards R' (even if optimization of long-term rewards Q is preferred). In some embodiments, Q(i,test) may be estimated using an episodic estimation and w $(\hat{R}_{i,Train})(S_i, C_i))$ may be generated by updating posterior distribution parameters using a one-step recursion structure:

$$Q(S,C)=R(S,C)+\Sigma P(S'|S,C)*\max C' \gamma t Q(S',C')$$

as described above.

At step 112, the trained content selection model 160 is output to one or more systems, such as, for example, the content selection system 26. The trained content selection model 160 is configured to implement the optimal impression allocation by selecting content element based on the calculated impression allocation. In some embodiments, the trained content selection model 160 is configured to first select one of a plurality of impression allocations based on one or more predetermined criteria and then select a content element based on the selected one of the impression allocations.

Figure 5:
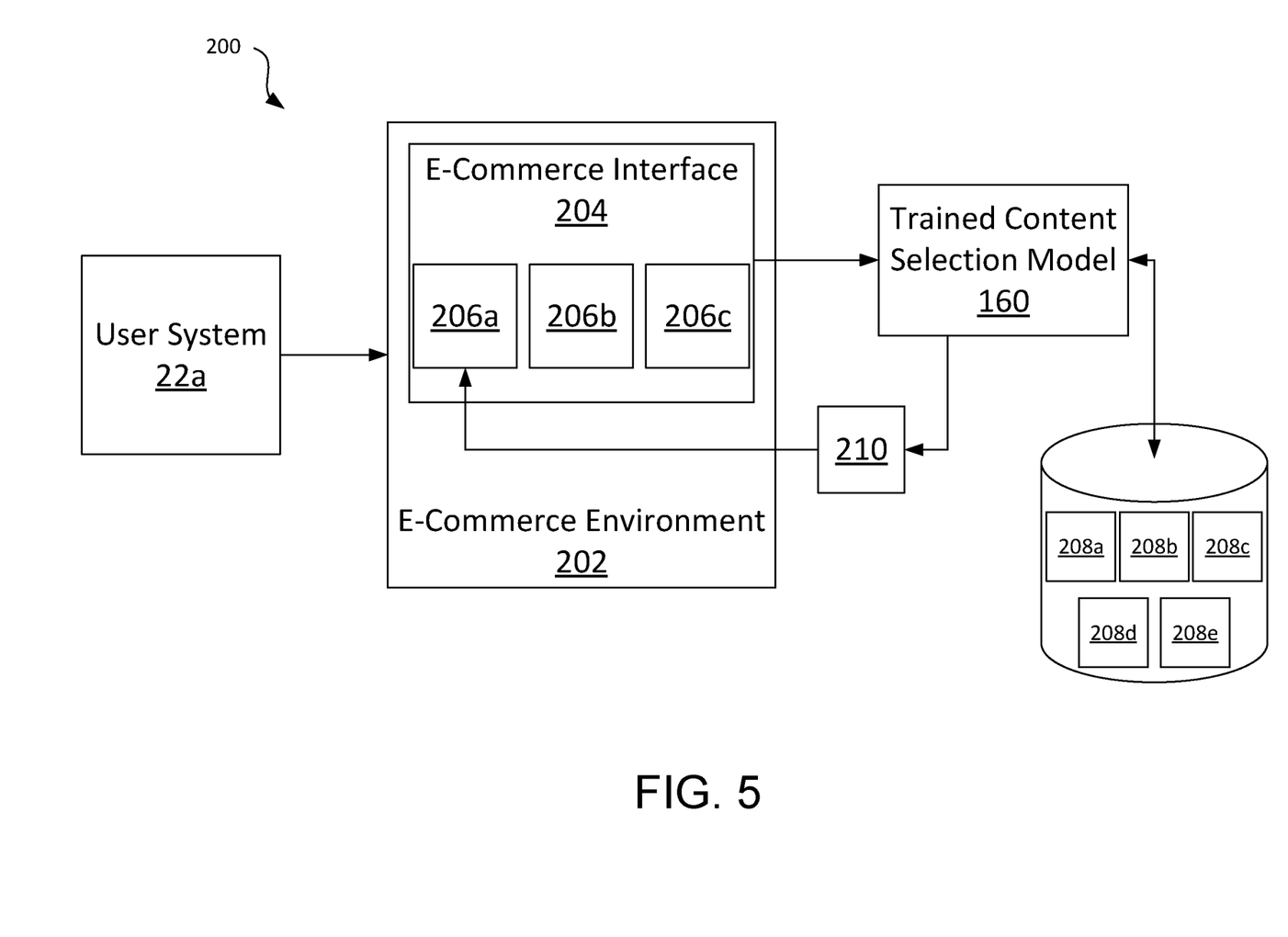
FIG. 5 illustrates a content selection process for selecting content for presentation to a user using a trained content selection model, in accordance with some embodiments.

FIG. 5 illustrates a content selection process 200 for achieving an optimal impression allocation for an interface using a trained content selection model 160, in accordance with some embodiments. A user may interact with a computer environment, such as an e-commerce environment 202, through one or more systems, such as, for example, a user system 22a. When a user interacts with the e-commerce interface 202, the e-commerce environment 202 presents an e-commerce interface 204 having a plurality of content containers 206a-206c (collectively "content containers 206"). At least one of the content containers 206, such as a first content container 206a, is configured to receive at least one content element selected from a plurality of content elements 208a-208e. The plurality of content elements 208a-208e may be stored in and retrieved from any suitable storage, such as, for example, a content database 32. The potential content elements 208a-208e may be selected based on any suitable criteria, such as, for example, a persona selected for the user.

In some embodiments, each of the potential content elements 208a-208e are provided to a trained content selection model 160, which is configured to select one of the plurality of potential content elements 208a-208e for presentation to a user in the first content container 206a. In some embodiments, the trained content selection model 160 considers the persona of the user and uses an optimal impression allocation to select the content element(s) 208a-208e to be provided as presentation elements 210.

The trained content selection model 160 selects presentation content element 210 from among the potential content elements 208a-208e and presents the selected presentation content element 210 to the user in the first content container 206a of the e-commerce interface 204. After receiving the e-commerce interface 204, a user may perform one or more actions. In some embodiments, a set of presentation content elements 210 are preselected for users having a first persona such that the e-commerce interface 204 with the selected presentation content elements 210 may be cached and provided to a user without delay. The trained content selection model 160 may be configured to select presentation content elements 210 on a predetermined interval, such as, for example, selecting new elements each day, week, month, etc.

In some embodiments, the one or more actions performed by the user after presentation of the e-commerce interface 204 including the presentation content element 210 is recorded and used for training of future iterations of the trained content selection model 160. For example, in various embodiments, the trained content selection model 160 may be replaced with an updated trained content selection model that has been trained using user interaction data from e-commerce interfaces 204 including presentation content elements 210 selected by the prior version of the trained content selection model 160. In some embodiments, the trained content selection model 160 may be updated and/or replaced on a predetermined interval, such as, for example, weekly, monthly, bi-monthly, etc.

Although the subject matter has been described in terms of exemplary embodiments, it is not limited thereto. Rather, the appended claims should be construed broadly, to include other variants and embodiments, which may be made by those skilled in the art.

What is claimed is:

1. A system for content selection and presentation, comprising:
a memory having instructions stored thereon, and a processor-configured to-read the instructions to:
receive a plurality of content elements configured for presentation in at least one content container;
select one of the plurality of content elements for presentation in the at least one content container, wherein the one of the plurality of content elements is selected by a trained selection model based on an optimal impression allocation, wherein the optimal impression allocation is selected using testing data used to compare calculated reward values, wherein the optimal impression allocation is configured to balance a short-term reward value and a long-term reward value of each of the plurality of content elements, wherein the short-term reward value indicates immediate rewards, and wherein the long-term reward value indicates a user return rate and is calculated as a sum of discounted short term rewards; and
generate an interface including the one of the plurality of content elements selected for presentation.

2. The system of claim 1, wherein the long-term reward value is determined by a Markov Decision Process (S,C,P,R,γ), where S represents a state space, C represents a content space, P represents a transition function, and R represents the immediate reward function.

3. The system of claim 1, wherein the short-term reward value is determined based on Thompson sampling of a posterior distribution reward function.

4. The system of claim 1, wherein the optimal impression allocation includes an estimated impression allocation generated according to an equation:

$$\sum_{C_i} \hat{I}_{S_i,C_i} \times \hat{R}_{(i,Test)}(S_i, C_i)$$

where $C_i$ is the content element, I is an impression value, $S_i$ is a state, and R is a reward function.

5. The system of claim 4, where the impression value I is calculated as:

$$\hat{I}_{S_i,C_i} = \frac{w(\hat{R}_{i,Train})(S_i, C_i)}{\sum_{C_j} w(\hat{R}_{i,Train})(S_i, C_j)}.$$

6. The system of claim 1, wherein the trained selection model includes a plurality of impression allocations, and wherein the optimal impression allocation is selected from the plurality of impression allocations based on one or more predetermined selection criteria.

7. The system of claim 1, wherein the long-term reward value is determined by a Markov Decision Process (S,C,P,R,γ), where S represents a state space, C represents a content space, P represents a transition function, and R represents the immediate reward function and the short-term reward value is determined based on Thompson sampling of a posterior distribution reward function.

8. A non-transitory computer readable medium having instructions stored thereon, wherein the instructions, when executed by a processor cause a device to perform operations comprising:
receiving a plurality of content elements configured for presentation in at least one content container;
selecting one of the plurality of content elements for presentation in the at least one content container, wherein the one of the plurality of content elements is selected by a trained selection model based on an optimal impression allocation, wherein the optimal impression allocation is configured to balance a short-term reward value and a long-term reward value of each of the plurality of content elements, wherein the optimal impression allocation is selected using testing data used to compare calculated reward values, wherein the short-term reward value indicates immediate rewards, and wherein the long-term reward value indicates a user return rate and is calculated as a sum of discounted short term rewards; and
generating an interface including the one of the plurality of content elements selected for presentation.

9. The non-transitory computer readable medium of claim 8, wherein the long-term reward value is determined by a Markov Decision Process (S,C,P,R,γ), where S represents a state space, C represents a content space, P represents a transition function, and R represents the immediate reward function.

10. The non-transitory computer readable medium of claim 8, wherein the short-term reward value is determined based on Thompson sampling of a posterior distribution reward function.

11. The non-transitory computer readable medium of claim 8, wherein the optimal impression allocation includes an estimated impression allocation generated according to an equation:

$$\sum_{C_i} \hat{I}_{S_i,C_i} \times \hat{R}_{(i,Test)}(S_i, C_i)$$

where $C_i$ is the content element, I is an impression value, $S_i$ is a state, and R is a reward function.

12. The non-transitory computer readable medium of claim 11, where the impression value I is calculated as:

$$\hat{I}_{S_i,C_i} = \frac{w(\hat{R}_{i,Train)}(S_i, C_i))}{\sum_{C_j} w(\hat{R}_{i,Train)}(S_i, C_j))}.$$

13. The non-transitory computer readable medium of claim 8, wherein the trained selection model includes a plurality of impression allocations, and wherein the optimal impression allocation is selected from the plurality of impression allocations based on one or more predetermined selection criteria.

14. The non-transitory computer readable medium of claim 8, wherein the long-term reward value is determined by a Markov Decision Process (S,C,P,R,γ), where S represents a state space, C represents a content space, P represents a transition function, and R represents the immediate reward function and the short-term reward value is determined based on Thompson sampling of a posterior distribution reward function.

15. A computer-implemented method, comprising:
receiving a plurality of content elements configured for presentation in at least one content container;
selecting one of the plurality of content elements for presentation in the at least one content container, wherein the one of the plurality of content elements is selected by a trained selection model based on an optimal impression allocation, wherein the optimal impression allocation is configured to balance a short-term reward value and a long-term reward value of each of the plurality of content elements, wherein the optimal impression allocation is selected using testing data used to compare calculated reward values, wherein the short-term reward value indicates immediate rewards, and wherein the long-term reward value indicates a user return rate and is calculated as a sum of discounted short term rewards; and
generating an interface including the one of the plurality of content elements selected for presentation.

16. The method of claim 15, wherein the long-term reward value is determined by a Markov Decision Process (S,C,P,R,γ), where S represents a state space, C represents a content space, P represents a transition function, and R represents the immediate reward function, and wherein the short-term reward value is determined based on Thompson sampling of a posterior distribution reward function.

17. The method of claim 15, wherein the optimal impression allocation includes an estimated impression allocation generated according to an equation:

$$\sum_{C_i} \hat{I}_{S_i,C_i} \times \hat{R}_{(i,Test)}(S_i, C_i)$$

where $C_i$ is the content element, I is an impression value, $S_i$ is a state, and R is a reward function.

18. The method of claim 17, where the impression value I is calculated as:

$$\hat{I}_{S_i,C_i} = \frac{w(\hat{R}_{i,Train)}(S_i, C_i))}{\sum_{C_j} w(\hat{R}_{i,Train)}(S_i, C_j))}.$$

19. The method of claim 15, wherein the trained selection model includes a plurality of impression allocations, and wherein the optimal impression allocation is selected from the plurality of impression allocations based on one or more predetermined selection criteria.

* * * * *